(12) United States Patent
Burrola et al.

(10) Patent No.: US 6,595,485 B2
(45) Date of Patent: Jul. 22, 2003

(54) SOLENOID VALVE WITH CUSHION BETWEEN PLUNGER AND PLUNGER STOP

(75) Inventors: Santos Burrola, Chihauhau (MX); Mahmood Rad, Saginaw, MI (US); Mark Anthony Shost, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/925,878

(22) Filed: Aug. 8, 2001

(65) Prior Publication Data

US 2003/0030018 A1 Feb. 13, 2003

(51) Int. Cl.[7] ............................................... F16K 31/02
(52) U.S. Cl. ...................... 251/64; 251/129.15; 335/257
(58) Field of Search ...................... 251/64, 129.15, 251/129.01; 335/257

(56) References Cited

U.S. PATENT DOCUMENTS

| | | | | |
|---|---|---|---|---|
| 3,013,768 A | * | 12/1961 | La Mastra | 251/129.15 |
| 4,901,974 A | * | 2/1990 | Cook et al. | 251/129.15 |
| 5,246,199 A | * | 9/1993 | Numoto et al. | 251/129.15 |
| 5,467,961 A | * | 11/1995 | Sausner et al. | 251/129.15 |
| 5,503,366 A | * | 4/1996 | Zabeck et al. | 251/129.15 |
| 5,544,856 A | * | 8/1996 | King et al. | 251/129.18 |
| 5,560,585 A | * | 10/1996 | Krimmer et al. | 251/129.15 |
| 5,878,991 A | * | 3/1999 | Krimmer et al. | 251/64 |
| 5,901,690 A | | 5/1999 | Hussey et al. | 123/568.26 |
| 6,019,344 A | * | 2/2000 | Engel et al. | 251/64 |
| 6,065,734 A | * | 5/2000 | Tackett et al. | 251/64 |
| 6,105,931 A | * | 8/2000 | Frank et al. | 251/129.15 |

FOREIGN PATENT DOCUMENTS

| | | |
|---|---|---|
| EP | 0397058 | 11/1990 |
| FR | 2761447 | 10/1998 |

\* cited by examiner

Primary Examiner—Ehud Gartenberg
Assistant Examiner—John Bastianelli
(74) Attorney, Agent, or Firm—Margaret A. Dobrowitsky

(57) ABSTRACT

A solenoid valve includes an outlet tube and a plunger stop. A plunger is slidably disposed within the solenoid valve between the outlet tube and the plunger stop. The plunger is movable between a closed position wherein the plunger engages the outlet tube to block fluid flow there through and an open position wherein the plunger is distanced from the outlet tube to permit fluid flow there through. The plunger includes a plunger insert that forms a dome-shaped plunger stop cushion that, during opening of the valve at least partially contacts a flat plunger contact face formed by the plunger stop. The dome-shaped plunger stop cushion relatively effectively damps the impact between the plunger and the plunger stop by allowing the plunger insert material, e.g., rubber, to compress more and absorb more energy of the impact. Thus, signal noise caused by the solenoid valve is minimized.

14 Claims, 2 Drawing Sheets

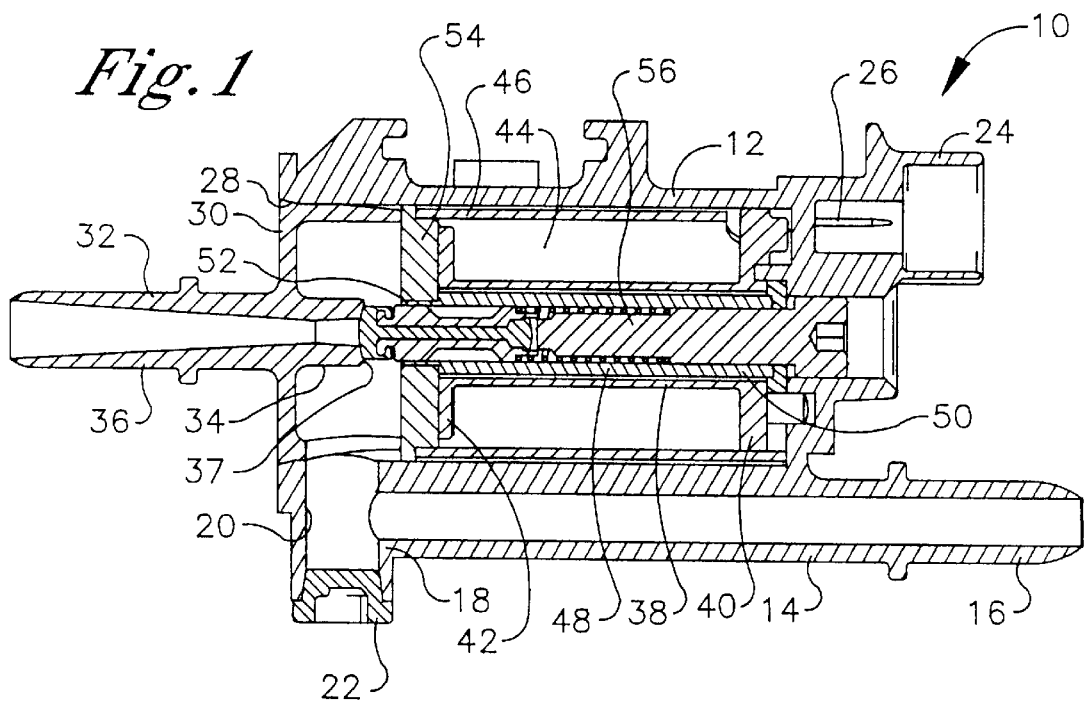
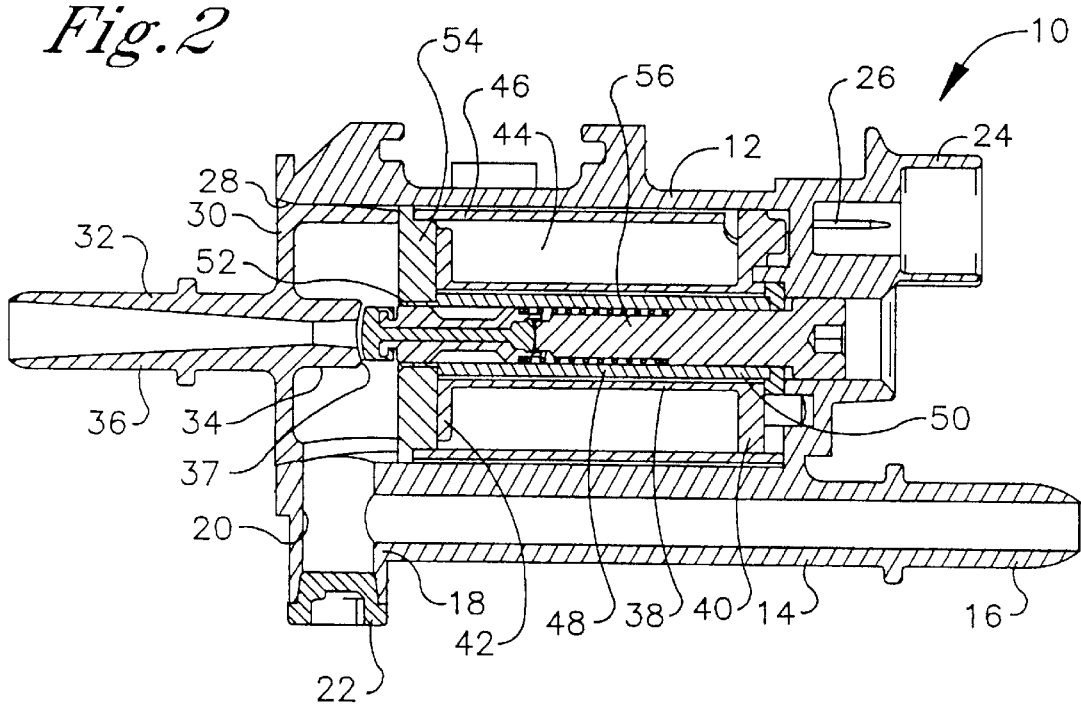

SOLENOID VALVE WITH CUSHION BETWEEN PLUNGER AND PLUNGER STOP

TECHNICAL FIELD

The present invention relates to motor vehicle sensors and actuators.

BACKGROUND OF THE INVENTION

To comply with state and federal environmental regulations, most motor vehicles are now equipped with a carbon canister installed to trap and store petroleum fuel vapors from the fuel system. With the canister, fuel vapor is not vented to the atmosphere, but instead is trapped in the canister and then periodically purged from the canister into the engine where the fuel vapor is burned along with the air-fuel mixture.

Solenoid valves have been provided that are used to purge the fuel vapor from the carbon canister. Unfortunately, many of these valves are adversely affected by signal noise caused by contact between the plunger and its corresponding stop or a lack of material for absorbing the impact between the plunger and the stop. Moreover, oxidation within the typically deep spring pocket can lead to failure of the valve.

The present invention has recognized these prior art drawbacks, and has provided the below-disclosed solutions to one or more of the prior art deficiencies.

SUMMARY OF THE INVENTION

A solenoid valve includes an outlet tube and a plunger assembly. The plunger assembly includes a plunger stop and a plunger. The plunger is movable between a closed position wherein the plunger engages the outlet tube to block fluid flow through the valve and an open position wherein the plunger is distanced from the outlet tube to permit fluid flow through the valve. Moreover, the plunger is stopped by the plunger stop and includes a plunger stop cushion to cushion impact between the plunger and the plunger stop.

Preferably, the plunger stop cushion is dome-shaped. Furthermore, in a preferred embodiment, the plunger forms a bore and includes a plunger insert disposed therein. Preferably, the plunger insert includes a proximal end plug that forms the dome-shaped plunger stop cushion. Additionally, the plunger stop forms a flat plunger contact face that contacts the plunger stop cushion when the valve is moved to the open position. In a preferred embodiment, the valve includes a coil that is energizable to bias the plunger from the closed position to the open position. A spring biases the plunger from the open position to the closed position. Preferably, the outlet tube is circumscribed by a valve seat and the plunger insert includes a distal end cap that engages the valve seat when the valve is in the closed position. The distal end cap is connected to the proximal end plug by a stem through the plunger.

In another aspect of the present invention, a solenoid valve includes an outlet tube and a plunger stop disposed stationarily relative to the tube. A plunger is disposed within the solenoid valve between the outlet tube and the plunger stop. The plunger is movable between a closed position and an open position. In the closed position, the plunger engages the outlet tube to block fluid flow through the valve and is distanced from the stop. In the open position, the plunger is distanced from the outlet tube and abuts the stop to permit fluid flow through the outlet passage. The plunger also includes a plunger stop cushion that contacts the plunger stop when the valve is opened.

In yet another aspect of the present invention, a solenoid valve includes outlet means and plunger stop means. The solenoid valve also includes plunger means that is movable between a closed position, wherein the plunger means engages the outlet means to block fluid flow through the valve, and an open position, wherein the plunger means is distanced from the outlet means to permit fluid flow through the valve and the plunger means is stopped by the plunger stop means. In this aspect, the plunger means includes means for cushioning impact between the plunger means and the plunger stop means.

The present invention will now be described, by way of example, with reference to the accompanying drawings, in which:

BRIEF DESCRIPTION OF THE DRAWINGS

FIG. 1 is a plan view of a solenoid valve in the closed position;

FIG. 2 is a plan view of the solenoid valve in the open position; and

DESCRIPTION OF AN EMBODIMENT OF THE INVENTION

Figure 3:
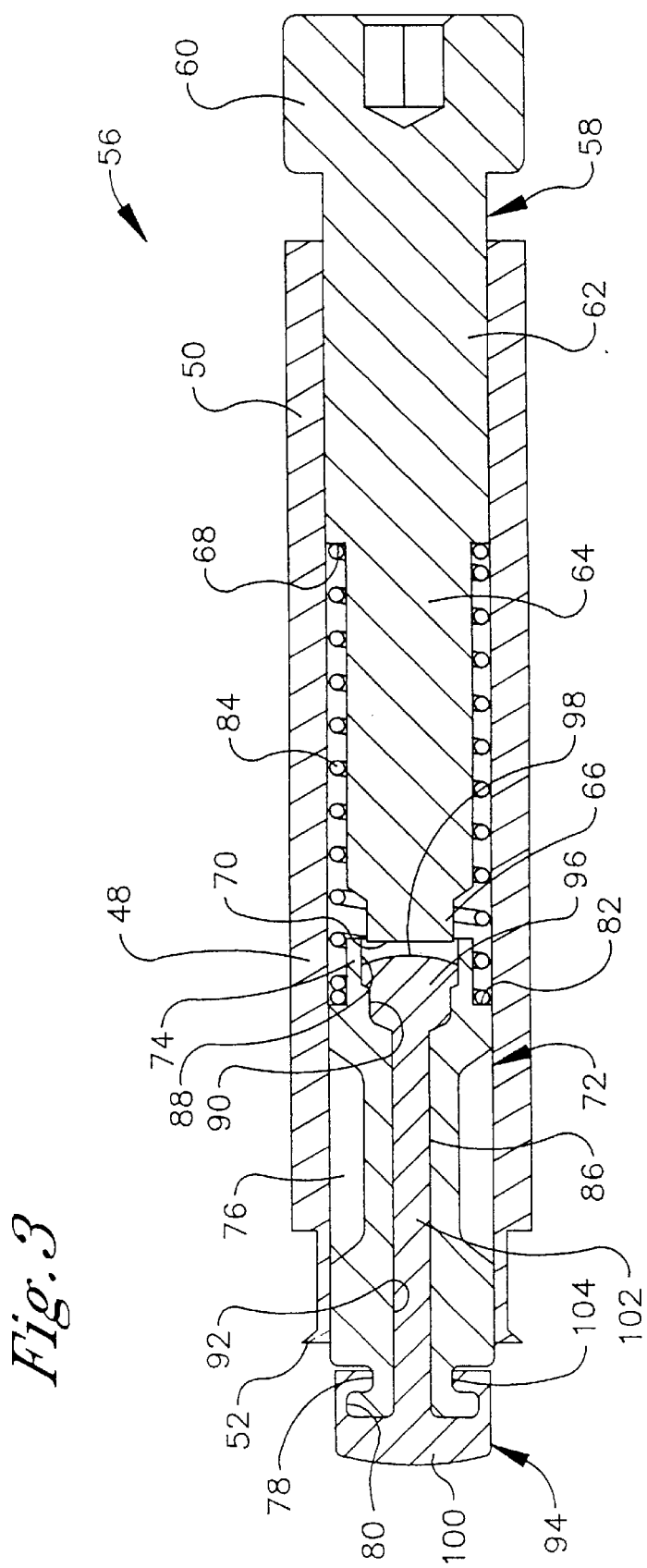
FIG. 3 is a detail view of the plunger assembly.

Referring initially to FIGS. 1 and 2, a solenoid valve is shown and generally designated 10. As shown in FIGS. 1 and 2, the solenoid valve 10 includes a hollow, generally cylindrical valve case 12. FIGS. 1 and 2 show that the valve case 12 forms an inlet tube 14 having a proximal end 16 and a distal end 18. The distal end 18 of the inlet tube 14 terminates at an access bore 20 having an access fitting 22 disposed therein. It is to be appreciated that the access fitting 22 seals the access bore 20.

As shown in FIGS. 1 and 2, the valve case 12 forms a female connector socket 24 having at least one electrode 26 disposed therein. Preferably, the female socket 24 is sized and shaped to receive a correspondingly sized and shaped male electrical connector (not shown). FIGS. 1 and 2 show that the valve case 12 is also formed with a relatively large opening 28 into which an outlet fitting 30 is fitted. As shown, the outlet fitting 30 includes an outlet tube 32 that defines a proximal end 34 and a distal end 36. The proximal end 34 of the outlet tube 32 is circumscribed by a valve seat 37 with which a plunger, described below, mates in order to block the flow of fluid through the outlet tube 32.

Within the case 12 is a preferably plastic, generally "I" shaped spool 38 that defines a proximal end 40 and a distal end 42. A hollow toroidal coil 44 of wire closely surrounds the spool 38 and a hollow, generally cylindrical coil sleeve 46 surrounds the coil 44. A hollow generally cylindrical plunger tube 48 that defines a proximal end 50 and a distal end 52 is disposed within the spool 38. A flange 54 is fitted around the distal end 52 of the plunger tube 48 adjacent to the distal end 42 of the spool 38. It is to be appreciated that the flange 54 provides support for the plunger tube 48 and the spool 38. Moreover, the flange 54 seals the portion of the valve case 12 in which the coil 44, spool 38, coil sleeve 46, etc. are disposed. As further shown in FIGS. 1 and 2, a plunger assembly 56 is disposed within the plunger tube 48.

Referring now to FIG. 3, details concerning the configuration of the plunger assembly 56 can be seen. FIG. 3 shows that the plunger assembly 56 includes a plunger stop 58 that is partially disposed in the proximal end 50 of the plunger tube 48. It is to be appreciated that the plunger stop 58 does not move within the valve 10. Moving to the left looking at FIG. 3, the plunger stop 58 defines a first portion 60, a second portion 62, a third portion 64 and a fourth portion 66. A first spring contact face 68 is established between the second portion 62 and third portion 64 of the plunger stop 58. Moreover, a flat plunger contact face 70 is formed at the end of the fourth portion 66 of the plunger stop 58. As shown in FIG. 3, a generally cylindrical, preferably magnetic plunger 72 is slidably disposed within the distal end 52 of the plunger tube 48. The plunger 72 defines a first portion 74 and a second portion 76 to the left of the first portion. Moving to further to the left looking at FIG. 3, the second portion 76 of the plunger 72 narrows to form a channel 78 and then widens to form an external lip 80 over which a correspondingly shaped plunger insert, described below, fits. As shown, a second spring contact face 82 is established between the first and second portions 74, 76 of the plunger 72. A spring 84 is installed in compression between the first spring contact face 68 and the second spring contact face 82 around the third and fourth portions 64, 66 of the plunger stop 58 and the first portion 74 of the plunger 72.

FIG. 3 shows a central bore 86 formed lengthwise through the plunger 72. Moving to the left looking at FIG. 3, the central bore 86 includes a relatively large diameter first portion 88 that narrows slightly to a second portion 90. The second portion 90 of the bore further narrows to a relatively small diameter third portion 92. As shown in FIG. 3, a resilient, preferably rubber plunger insert 94 is installed within the central bore 86 of the plunger 72. FIG. 3 shows that the plunger insert 94 includes a proximal end 96 plug sized and shaped to fit into the first and second portions 88, 90 of the central bore 86 formed in the plunger 72. The proximal end 96 of the plunger insert 94 defines a dome-shaped plunger stop cushion 98. As shown, the plunger insert 94 also includes a distal end cap 100 connected to the proximal end plug 96 by a generally cylindrically solid stem 102. The stem 102 is sized such that it fits within the third portion 92 of the plunger bore 86. Still referring to FIG. 3, the distal end cap 100 forms an internal lip 104 that fits over the external lip 80 formed by the plunger 72. The internal lip 104 is sized and shaped so that it fits into the channel 78 adjacent to the external lip 80.

As shown, the diameter of the first portion 60 of the plunger stop 58 is approximately equal to the outer diameter of the plunger tube 48. Moreover, the diameter of the second portion 62 is such that the plunger stop 58 can be press fitted into the plunger tube 48. The diameter of the third portion 64 of the plunger stop 58 is approximately equal to the diameter of the first portion 74 of the plunger 72 and is established so the spring 68 can be installed radially around these portions 64, 74 of the plunger stop 58 and the plunger 72, respectively. Continuing the description, the diameter of the fourth portion 66 of the plunger stop 58 is slightly smaller than the inner diameter of the first portion 88 of the plunger bore 86. As such, when the valve 10 is opened, as described below, the first portion 74 of the plunger 72 fits around the fourth portion 66 of the plunger stop 58 allowing the dome-shaped plunger stop cushion 98 to contact the plunger contact face 70 when the valve 10 is fully opened.

Operation

It is to be understood that when the coil 44 is de-energized, the spring 84 biases the plunger 72 toward the outlet tube 32 until the solenoid valve 10 is in the closed position, shown in FIG. 1. In the closed position, the distal end cap 100 of the plunger insert 94 engages the valve seat 37 that circumscribes the proximal end 34 of the outlet tube 32 to block the flow of air through the solenoid valve 10. On the other hand, when the coil 44 is energized, a magnetic field is created that overcomes the force of the spring 84 and moves the plunger 72 to the right looking at FIGS. 1 and 2 until the solenoid valve 10 is in the open position as shown in FIG. 2 against the stop 58. In the open position, the distal end cap 100 of the plunger insert 94 is distanced from the valve seat 37 to allow air to flow through the valve 10. When the valve 10 is fully opened, the dome-shaped plunger stop cushion 98 cushions the impact between the plunger 72 and the plunger stop 58.

With the configuration of structure described above, it is to be appreciated that the dome-shaped plunger stop cushion 98 relatively effectively damps the impact between the plunger 72 and the plunger stop 58 by allowing the plunger insert 94 material, e.g., rubber, to compress more and absorb more energy of the impact. Thus, signal noise caused by the solenoid valve 10 is reduced.

While the particular SOLENOID VALVE as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A solenoid valve, comprising:

an outlet tube;

a plunger assembly including a plunger stop and a plunger;

a plunger insert disposed within the plunger, the plunger insert establishing a dome-shaped plunger stop cushion;

a portion of the plunger surrounding the plunger stop cushion;

a spring surrounding the plunger stop cushion and the portion of the plunger that surrounds the plunger stop cushion; and the plunger being movable between a closed position wherein the plunger engages the outlet tube to block fluid flow through the valve and an open position wherein the plunger is distanced from the outlet tube to permit fluid flow through the valve and the plunger is slopped by the stop, the plunger stop cushion cushioning impact between the plunger and the plunger stop.

2. The valve of claim 1, wherein the plunger forms a bore and the plunger further includes a plunger insert disposed therein, the plunger insert includes a proximal end plug that forms the dome-shaped plunger stop cushion.

3. The valve of claim 2, wherein the plunger stop forms a flat plunger contact face that at least partially contacts the plunger stop cushion when the valve is moved to the open position.

4. The valve of claim 1, further comprising a coil being energizable to bias the plunger from the closed position to the open position.

5. The valve of claim 4, further comprising a spring to bias the plunger from the open position to the closed position.

6. The valve of claim 2, wherein the outlet tube is circumscribed by a valve seat and the plunger insert includes a distal end cap that engages the valve seat when the valve is in the closed position.

7. The valve of claim 6, wherein the distal end cap is connected to the proximal end plug by a stem through the plunger.

8. A solenoid valve, comprising:
   an outlet tube;
   a plunger stop disposed stationarily relative to the tube; and
   a plunger disposed within the solenoid valve between the outlet tube and the plunger stop;
   a plunger insert disposed within the plunger, the plunger insert establishing a dome-shaped plunger stop cushion;
   a portion of the plunger surrounding the plunger stop cushion;
   a spring surrounding the plunger stop cushion and the portion of the plunger that surrounds the plunger stop; and
   the plunger being movable between a closed position wherein the plunger engages the outlet tube to block fluid flow through the valve and is distanced from the stop, and an open position wherein the plunger is distanced from the outlet tube and abuts the stop to permit fluid flow through the outlet passage, the plunger stop cushion contacting the plunger stop when the valve is opened.

9. The valve of claim 8, wherein the plunger forms a bore and the plunger further includes a plunger insert disposed therein, the plunger insert includes a proximal end plug that forms the dome-shaped plunger stop cushion.

10. The valve of claim 9, wherein the plunger stop forms a flat plunger contact face that at least partially contacts the plunger stop cushion when the valve is moved to the open position.

11. The valve of claim 8, further comprising a coil being energizable to bias the plunger from the closed position to the open position.

12. The valve of claim 11, further comprising a spring to bias the plunger from the open position to the closed position.

13. The valve of claim 9, wherein the outlet tube is circumscribed by a valve seat and the plunger insert includes a distal end cap that engages the valve seat when the valve is in the closed position.

14. The valve of claim 13, wherein the distal end cap is connected to the proximal end plug by a stem through the plunger.

* * * * *